United States Patent
Schöning et al.

(10) Patent No.: US 8,935,370 B2
(45) Date of Patent: Jan. 13, 2015

(54) SYSTEM AND METHOD FOR MANAGING A PLURALITY OF WEB SERVICES

(75) Inventors: Harald Schöning, Dieburg (DE); Johannes Viegener, Karlsruhe (DE); Keith Swenson, San Jose, CA (US)

(73) Assignee: Software AG, Darmstadt (DE)

( * ) Notice: Subject to any disclaimer, the term of this patent is extended or adjusted under 35 U.S.C. 154(b) by 1701 days.

(21) Appl. No.: 11/779,317

(22) Filed: Jul. 18, 2007

(65) Prior Publication Data
US 2008/0028316 A1    Jan. 31, 2008

(30) Foreign Application Priority Data
Jul. 19, 2006    (EP) ................................. 06015020

(51) Int. Cl.
*G06F 15/16*    (2006.01)
*H04L 29/08*    (2006.01)

(52) U.S. Cl.
CPC ............................ *H04L 67/02* (2013.01)
USPC ....................................... 709/223

(58) Field of Classification Search
CPC ........................................ H04L 67/02
USPC ............................................. 709/223
See application file for complete search history.

(56) References Cited

U.S. PATENT DOCUMENTS

| | | | |
|---|---|---|---|
| 2005/0160153 A1* | 7/2005 | Knutson et al. | 709/217 |
| 2006/0168122 A1* | 7/2006 | Acharya et al. | 709/219 |
| 2008/0281969 A1* | 11/2008 | Horton et al. | 709/227 |

FOREIGN PATENT DOCUMENTS

| | | |
|---|---|---|
| EP | 1 641 215 A2 | 3/2006 |
| WO | 2005/029807 A1 | 3/2005 |

OTHER PUBLICATIONS

Chinnici, R., et al., "W3C—Web Services Description Language (WSDL) Version 2.0 Part 1: Core Language"; Mar. 27, 2006; retrieved from Internet: http://www.w3.org/TR/2006/CR-wsdl20-20060327/wsdl20.pdf, 135 pages.
European Search Report for application No. EP 06 01 5020, mailed Jan. 23, 2007.

* cited by examiner

*Primary Examiner* — Bryan Lee
(74) *Attorney, Agent, or Firm* — Meyertons Hood Kivlin Kowert & Goetzel, P.C.; Jeffrey C. Hood

(57) ABSTRACT

System and method for managing a plurality of web services. The system may include a registry with a description for at least one of the plurality of web services, wherein the description of the at least one web service may comprise a first endpoint for a first runtime condition and a second endpoint for a second runtime condition.

22 Claims, 3 Drawing Sheets

SYSTEM AND METHOD FOR MANAGING A PLURALITY OF WEB SERVICES

PRIORITY CLAIM

Figure 1:
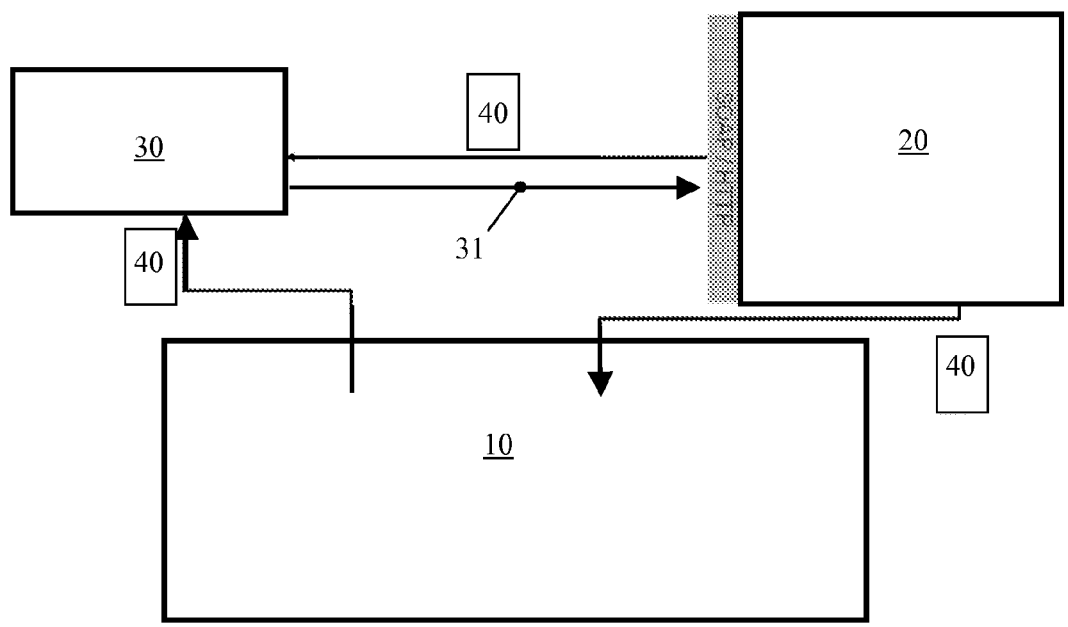

This application claims benefit of priority of European application no. 06 015 020.8 titled "System and Method for Managing a Plurality Of Web Services", filed Jul. 19, 2006, and whose inventors are Harald Schöning and Johannes Viegener.

INCORPORATED BY REFERENCE

European application no. 06 015 020.8 titled "System and Method for Managing a Plurality Of Web Services", filed Jul. 19, 2006, and whose inventors are Harald Schöning and Johannes Viegener, is hereby incorporated by reference in its entirety as though fully and completely set forth herein.

1. Technical Field

The present invention relates to a system and a method for managing a plurality of web services of a service oriented software architecture.

2. The Prior Art

Web services are standardized interfaces for exchanging data from one computer to another over a computer network, using, for example, the Internet. An application may request data from a server over the computer network using a web service provided by the server. Such a request is typically enclosed in a SOAP envelope, which is conveyed using HTTP, and may comprise XML in conjunction with other web-related standards. More technically, advanced applications combine various web services to obtain or process the desired data. A software architecture, which is developed around a plurality of web services, is called a service oriented architecture (SOA).

In a SOA resources are made available to participants in the network as independent services that the participants can access in a standardized way. Whereas most definitions of a SOA use SOAP requests conveyed via HTTP/HTTPS over TCP/IP, a SOA may use any web service-based technology. The web services interoperate based on formal definitions which are independent from the underlying platform and programming language. The interface definition encapsulates the specific implementations. A SOA is independent of a specific development technology (such as Java and .NET). The software components become very reusable because the interface is standards-compliant and is independent from the underlying implementation of the web service logic. For example, a C# (C Sharp) service could be used by a JAVA application and vice versa.

A developer of a new application in an SOA needs access to the various web services, which are to be used by the new application. This does not only address the availability of the interface specifications of the involved web services, but also the provision of actually active web services that can be called for testing the new application. However, such testing calls must not interfere with the real world. For example calling a web service causing a money transfer for test purposes must not result in a real money transfer.

A similar scenario applies after development, when the new application is to be tested in a larger setting before it is approved for production usage. Again, new test instances of web services called by the new application might have to be created, because of different requirements concerning stability or result generation during the development phase and the testing phase in a larger setting. When the application is finally approved for production, the calls to the various test web services have to be replaced by calls to the real services. The various replacement steps exchanging the web services for development, large scale testing and finally production present a substantial risk for introducing errors into the final application.

Thus, improvements in development and testing of deployment of a new application would be desirable.

SUMMARY OF THE INVENTION

Various embodiments are described below of a system for managing a plurality of web services. The system may include a registry including a description for at least one of the plurality of web services, wherein the description of the at least one web service comprises a first endpoint for a first runtime condition and a second endpoint for a second runtime condition.

Accordingly, web services for different runtime landscapes (e.g. development, test, production) can be managed within a single registry without losing control over the services of the landscapes and the involved risk of introducing errors. On deployment, the correct endpoints can be automatically selected depending on the respective runtime condition. As a result, various test and production environments of a new application can be automatically generated.

In one embodiment, the system may be further adapted to select one of the first and second endpoint during runtime depending on an evaluation of environmental information concerning the runtime condition provided by an application calling the web service. Setting the value of a single variable in the application may therefore indicate which landscape is used, since the one or more descriptions of the web services in the registry automatically include endpoints adapted to the respective runtime condition (e.g. test, deployment, etc.).

In another embodiment, the system may be further adapted to select one of the first and second endpoint during runtime depending on the runtime condition stored in the registry. The registry may, for example, store information which reflects the current state of the development process and accordingly selects the appropriate landscape of web services for the new application.

In one embodiment, the first and second endpoint may be defined in a first and a second WSDL document for the web service stored in the registry, which may be related to each other, for example by referencing each other, wherein each of the WSDL documents may be marked for its specific runtime condition.

However, in one embodiment, the first and the second endpoint may be defined in a single WSDL document for the web service, e.g., as a property component of the WSDL document. As a result, the registry may store WSDL descriptions of web service "twins", wherein one of the twins may be used for a first runtime condition and the other for another runtime condition. The value of the property component may be determined during runtime using a SOAP module of a request for the web service.

In some embodiments, the first endpoint may be adapted to be used for testing an application calling the at least one web service, whereas the second endpoint is preferably adapted to be used for deployment of an application calling the at least one web service. However, similar methods as those described herein might also be used to select between other landscapes, i.e. for other runtime conditions.

In some embodiments, the system may further include means for monitoring the endpoints of the plurality of web services during runtime and/or means for issuing a warning if a first web service is called with an endpoint for a first runtime condition and a second web service is called with an endpoint for a second runtime condition. The monitoring function may avoid inconsistencies, which are likely to cause errors in the execution of the new application.

According to a further aspect, embodiments herein may relate to a method for managing a plurality of web services comprising the step of storing a description for at least one of the plurality of web services in a registry, wherein the description of the at least one web service comprises a first endpoint for a first runtime condition and a second endpoint for a second runtime condition.

Further advantageous modifications of embodiments of this system and method are defined in further descriptions below.

SHORT DESCRIPTION OF THE DRAWINGS

Figure 2:
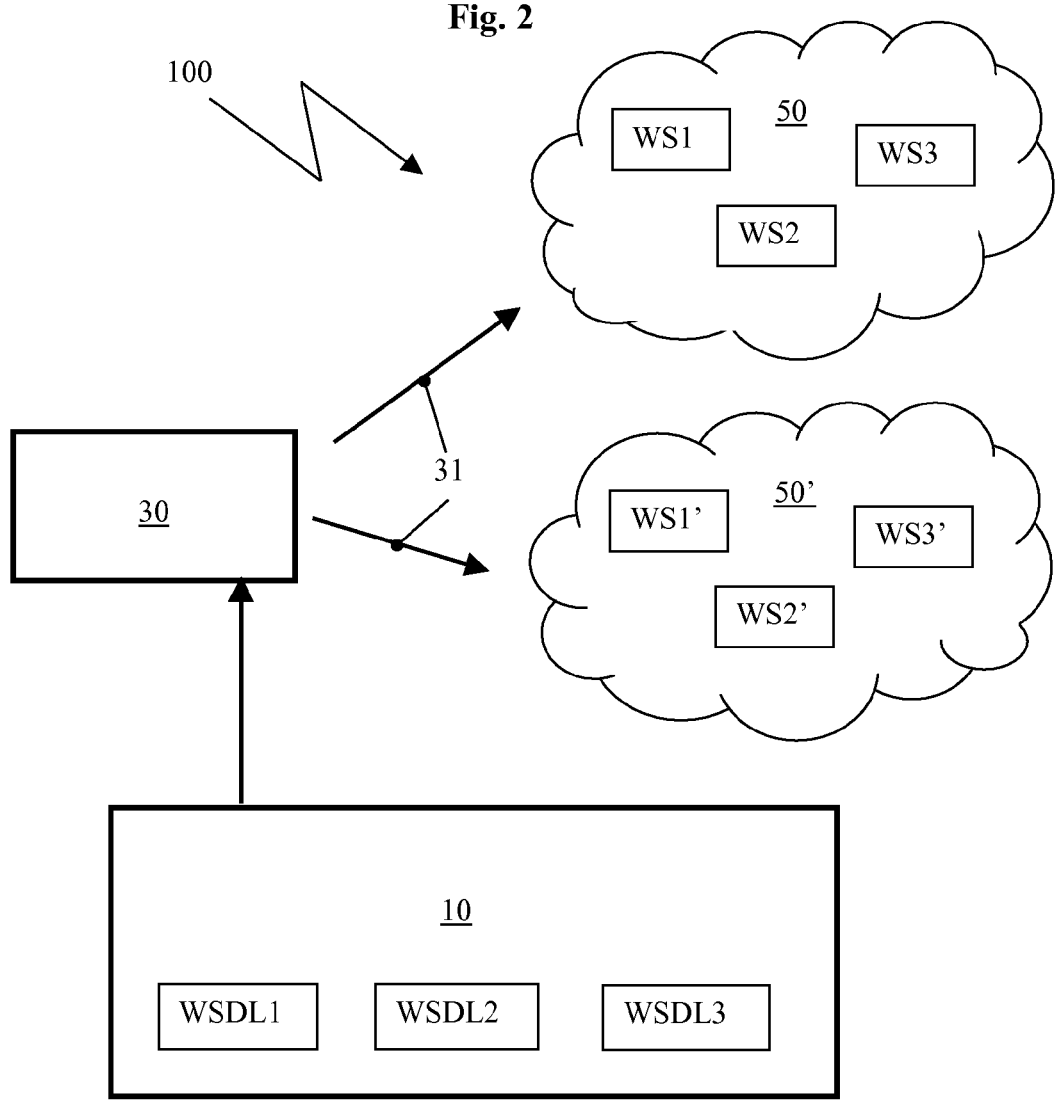

In the following detailed description, presently preferred embodiments of the invention are further described with reference to the following figures:

FIG. 1: An exemplary general overview of an example of a simplified SOA comprising an application calling a Web Service and a registry with a description of the Web Service;

FIG. 2: An exemplary simplified overview of an SOA having two landscapes with a plurality of web service twins; and FIG. 3: A flow chart illustrating exemplary steps performed during runtime in a system and method according to an embodiment of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

FIG. 1 presents an exemplary overview of an extremely simplified SOA: An application 30 issues a request 31 for a web service 20. To this end, the application 30 may need at first a description about the interface definitions of the web service 20. This description 40, which may for example be provided in the Web Service Definition Language (WSDL), can either be obtained directly from the web service 20 or from a registry 10 (cf. FIG. 1).

The registry 10 may include descriptions of all web services of the SOA. For example, WSDL files 40 may include information about the function, the data, the data type and the exchange protocols of the respective web service. Therefore, if the application 30 intends to send a request to the web service 20, it can obtain the WSDL file 40 from the registry 10 to find out how to access the web service 20.

However, when the new application 30 is being developed, it may be necessary to repeatedly contact the involved web service 20 for testing purposes, for example to verify, whether all requirements of the interface in the call to the web serve are satisfied and/or whether the response from the web service is properly received and processed by the application 30. If the web service 20 is actually deployed, each of these testing calls may cause some real world operation (e.g., the reservation of an airline ticket or the transfer of money from one account to another). In this context, note that the web service 20 might be somewhere on the Internet and its operation may not necessarily be under the control of the developer of the new application 30.

Accordingly, in some embodiments, the system may include service "twins" as schematically shown in FIG. 2: As can be seen, the registry 10 may store single descriptions WSDL1-WSDL3 of corresponding web services, e.g., with multiple endpoints, each carrying a reference to the runtime landscape 50 or 50' it belongs to. The term "landscape" refers to a specific part of the overall SOA 100, which can be distinguished by some kind of designated attribute. In the simplified embodiment shown in FIG. 2, there is a separate test landscape 50 and separate production landscape 50'. Both landscapes 50, 50' may provide at least partially the same web services WS1-WS3 and WS1'- WS3', but only the production web services WS1'-WS3' may be running in real life and are for example causing business transactions. The test versions of productive services (e.g. provided by some $3^{rd}$ party) can be automatically generated and added to the registry 10.

Other types of landscape distinctions can also be used; for example, a development landscape versus a larger testing landscape or the landscape for one company versus the landscape for another company may be used. Further, there may be not only two, but three or more landscapes. Thus, embodiments are not limited to the landscape distinctions described above.

To manage the above explained family of service twins without errors, the endpoints for the two landscapes 50, 50', in which the web services WS1-WS3 and WS1'-WS3' exist, may be defined in the single registry 10. Thus, the web service interface descriptions WSDL1-WSDL3may be shared between the landscapes 50, 50', while the endpoints are not.

However, it is to be noted that instead of using single WSDL descriptions WSDL1-WSDL3 for the web services WS1-WS3 and WS1'-WS3', there could alternatively also be two sets of related descriptions WSDL1-WSDL3 and WSDL1'-WSDL3' stored in the registry (not shown in FIG. 2), wherein the two WSDL descriptions belonging to a service twin (for example WSDL1 and WSDL1') are related to each other. Depending on the runtime condition one or the other (or possibly a third) description is used.

In some embodiments, the endpoints for the two landscapes 50, 50' may be defined in a single WSDL file for a service twin using the "properties" extensibility mechanism provided in WSDL 2.0. A "property" represents a named runtime value which affects the behavior of an aspect of a web service interaction. For example, a SOAP module of a request may specify a property to control the endpoints. This is illustrated in the following example for an exemplary WSDL file describing service twins:

```
<?xml version="1.0" encoding="UTF-8"?>
<description
    xmlns="http://www.w3.org/2006/01/wsdl"
    targetNamespace="http://namespaces.softwareag.com/2004/wsdl/resSvc"
    xmlns:tns="http://namespaces.softwareag.com/2004/wsdl/resSvc"
```

-continued

```
        xmlns:ghns="http://namespaces.softwareag.com/2004/schemas/resSvc"
        xmlns:wsoap="http://www.w3.org/2006/01/wsdl/soap"
        xmlns:soap="http://www.w3.org/2003/05/soap-envelope"
        xmlns:wsdlx="http://www.w3.org/2006/01/wsdl-extensions"
>
        <documentation>
                This document describes the reservation Web service.
        </documentation>
        <types>
            <xs:schema xmlns:xs="http://www.w3.org/2001/XMLSchema"
targetNamespace="http://namespaces.softwareag.com/2004/schemas/resSvc"
xmlns="http://namespaces.softwareag.com/2004/schemas/resSvc">
                    <xs:element name="checkAvailability" type="tCheckAvailability"/>
                    <xs:complexType name="tCheckAvailability">
                        <xs:sequence>
                            <xs:element name="checkInDate" type="xs:date"/>
                            <xs:element name="checkOutDate" type="xs:date"/>
                            <xs:element name="roomType" type="xs:string"/>
                        </xs:sequence>
                    </xs:complexType>
                    <xs:element name="checkAvailabilityResponse" type="xs:double"/>
                    <xs:element name="invalidDataError" type="xs:string"/>
            </xs:schema>
        </types>
        <interface name="reservationInterface">
            <fault name="invalidDataFault" element="ghns:invalidDataError"/>
            <operation name="opCheckAvailability"
                    pattern="http://www.w3.org/2006/01/wsdl/in-out"
                    style="http://www.w3.org/2006/01/wsdl/style/iri"
                    wsdlx:safe="true">
                <input messageLabel="In" element="ghns:checkAvailability"/>
                <output messageLabel="Out"
                        element="ghns:checkAvailabilityResponse"/>
                <outfault ref="tns:invalidDataFault" messageLabel="Out"/>
            </operation>
        </interface>
        <binding name="reservationSOAPBinding"
            interface="tns:reservationInterface"
            type="http://www.w3.org/2006/01/wsdl/soap"
            wsoap:protocol="http://www.w3.org/2003/05/soap/bindings/HTTP">
            <fault ref="tns:invalidDataFault" wsoap:code="soap:Sender"/>
            <operation ref="tns:opCheckAvailability"
                    wsoap:mep="http://www.w3.org/2003/05/soap/mep/soap-response"/>
        </binding>
        <service name="reservationService"
                                interface="tns:reservationInterface">
            <endpoint name="reservationEndpointTest"
                    binding="tns:reservationSOAPBinding"
                    address="http://test.softwareag.com/2004/reservation">
                <property ref="http://features.softwareag.com/landscapes/type">
                    <documentation>
                        This endpoint belongs to the test landscape
                    </documentation>
                    <value>test</value>
                </property>
            </endpoint>
            <endpoint name="reservationEndpointProduction"
                        binding="tns:reservationSOAPBinding"
                        address="http://production.softwareag.com/2004/reservation">
                <property ref="http://features.softwareag.com/landscapes/type">
                    <documentation>
                        This endpoint belongs to the production landscape
                    </documentation>
                    <value>production</value>
                </property>
            </endpoint>
        </service>
</description>
```

As can be seen, in this example, two endpoints are defined, one for the test landscape, the other for the production landscape. The runtime value of the property component therefore determines one of two possible endpoints and thereby, whether the web service of the test landscape or of the production landscape will be addressed.

Alternatively, the endpoints of the two landscapes can be specified in accordance with the UDDI-XML-Schema (UDDI 3.0), as shown below:

```xml
<uddi:businessService
        businessKey="uddi:35f2eca0-eef2-11da-a924-c9108119a4e5"
        serviceKey="uddi:4fc7c540-ef08-11da-bf78-dc56dc1260cf"
        xmlns:uddi="urn:uddi-org:api_v3"
        xmlns:dsig="http://www.w3.org/2000/09/xmldsig#"
        xmlns:scc14n="urn:uddi-org:schemaCentricC14N:2002-07-10">
        xmlns:xml="http://www.w3.org/XML/1998/namespace">
<uddi:name xml:lang="en-US">
            reservationService
        </uddi:name>
        <uddi:description
                    xml:lang="en">
                        Service for reservation available in test and production landscape
        </uddi:description>
        <uddi:bindingTemplates>
            <uddi:bindingTemplate
                bindingKey="uddi:50357b30-ef08-11da-bf78-80c376f5f0f0"
                serviceKey="uddi:4fc7c540-ef08-11da-bf78-dc56dc1260cf">
                <uddi:accessPoint useType="endPoint">
                    http://test.softwareag.com/2004/reservation
                </uddi:accessPoint>
                <uddi:tModelInstanceDetails>
                    <uddi:tModelInstanceInfo
                        tModelKey="uddi:4fb24170-ef08-11da-bf78-8f16f66201d4">
                        <uddi:instanceDetails xmlns:uddi="urn:uddi-org:api_v3">
                            <uddi:description xml:lang="en-US">
                                the wsdl:binding that this wsdl:port implements
                            </uddi:description>
                            <uddi:instanceParms>
                                    reservationSOAPBinding
                            </uddi:instanceParms>
                        </uddi:instanceDetails>
                    </uddi:tModelInstanceInfo>
                    <uddi:tModelInstanceInfo
                        tModelKey="uddi:4f8516f0-ef08-11da-bf78-c304af4ea516"/>
                </uddi:tModelInstanceDetails>
                <uddi:categoryBag>
                    <uddi:keyedReference
                        tModelKey="uddi:features.softwareag.com:landscapes"
                        keyValue="test"/>
                </uddi:categoryBag>
            </uddi:bindingTemplate>
            <uddi:bindingTemplate
                bindingKey="uddi:50357b30-ef08-11da-bf78-80c376f5f0f1"
                serviceKey="uddi:4fc7c540-ef08-11da-bf78-dc56dc1260cf">
                <uddi:accessPoint useType="endPoint">
                    http://production.softwareag.com/2004/reservation
                </uddi:accessPoint>
                <uddi:tModelInstanceDetails>
                    <uddi:tModelInstanceInfo
                        tModelKey="uddi:4fb24170-ef08-11da-bf78-8f16f66201d4">
                        <uddi:instanceDetails>
                            <uddi:description xml:lang="en-US">
                                the wsdl:binding that this wsdl:port implements
                            </uddi:description>
                            <uddi:instanceParms>
                                reservationSOAPBinding
                            </uddi:instanceParms>
                        </uddi:instanceDetails>
                    </uddi:tModelInstanceInfo>
                    <uddi:tModelInstanceInfo
                        tModelKey="uddi:4f8516f0-ef08-11da-bf78-c304af4ea516"/>
                </uddi:tModelInstanceDetails>
                <uddi:categoryBag>
                    <uddi:keyedReference
                        tModelKey="uddi:features.softwareag.com:landscapes"
                        keyValue="production"/>
                </uddi:categoryBag>
            </uddi:bindingTemplate>
        </uddi:bindingTemplates>
```

```
    <uddi:categoryBag>
        <uddi:keyedReference
                    keyName="service namespace"
                    keyValue="http://namespaces.softwareag.com/2004/wsdl/resSvc"
                    tModelKey="uddi:uddi.org:xml:namespace"/>
        <uddi:keyedReference
                    keyName="WSDL type"
                    keyValue="service"
                    tModelKey="uddi:uddi.org:wsdl:types"/>
        <uddi:keyedReference
                    keyName="service local name"
                    keyValue="reservationService"
                    tModelKey="uddi:uddi.org:xml:localname"/>
        <uddi:keyedReference
                    keyValue="uddi:2dd13990-8991-11d9-8457-ca59ad32ca75"
                    tModelKey="uddi:2dafcee0-8991-11d9-8457-f2038ed2fcd0"/>
    </uddi:categoryBag>
</uddi:businessService>
```

An UDDI query to find the endpoint for a given landscape (e.g. test) could then look as follows:

```
<find_binding xmlns="urn:uddi-org:api_v3"
        serviceKey="uddi:4fc7c540-ef08-11da-bf78-dc56dc1260cf">
    <findQualifiers>
        <findQualifier>exactNameMatch</findQualifier>
    </findQualifiers>
    <categoryBag>
        <keyedReference
            tModelKey="uddi:features.softwareag.com:landscapes"
            keyValue="test"/>
    </categoryBag>
</find_binding>
```

Figure 3:
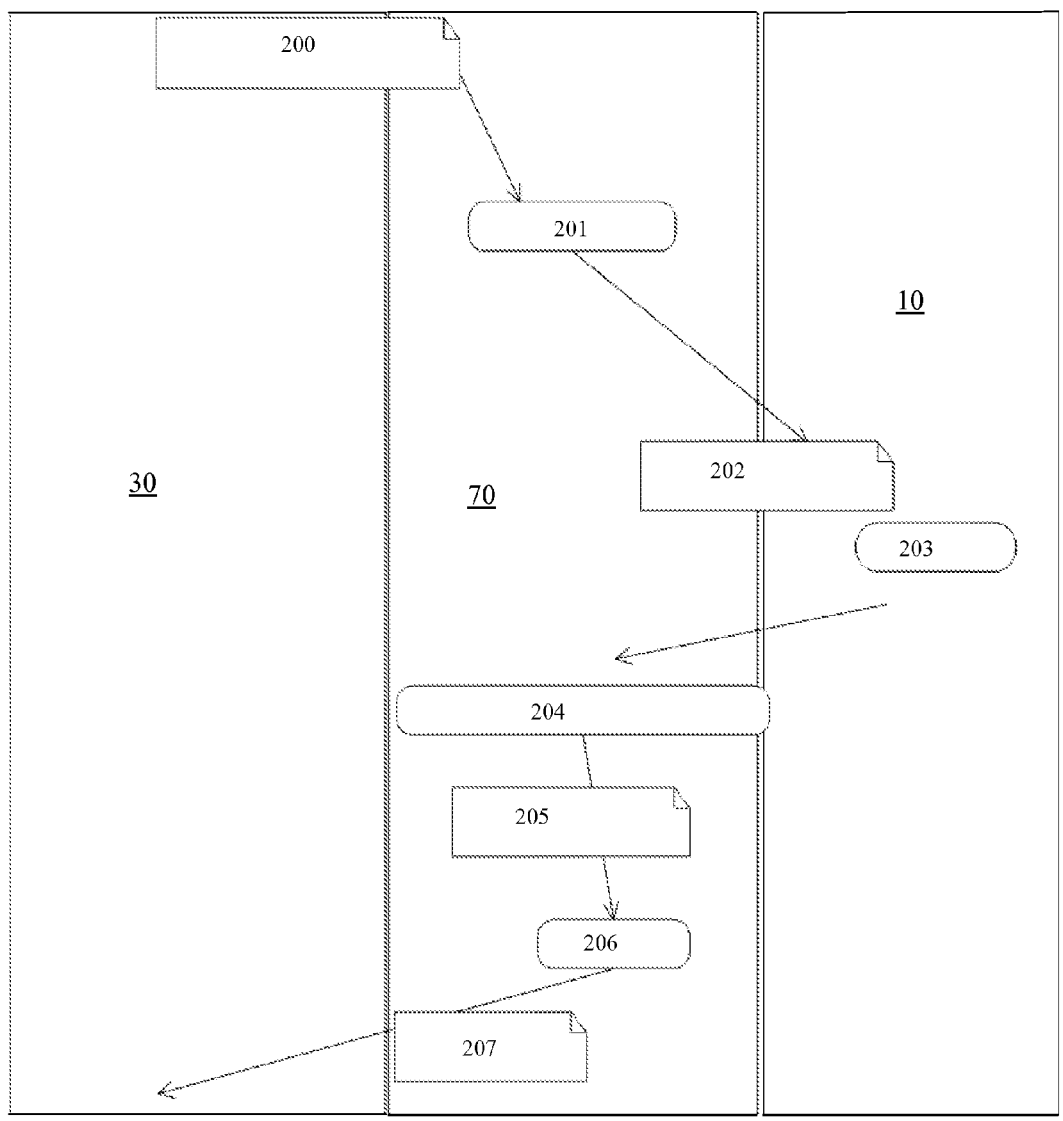

The endpoint information thus manifested in the WSDL file or the registry (UDDI) can be used in various scenarios one of which is described in the following with reference to the flowchart of FIG. 3, which illustrates three components involved:

A web service execution component 70 may be at runtime (for example of a test run) available to an application 30. The web service execution component 70 may be called in step 200 by the application 30, when a web service 20 is to be executed, and may receive a unique identification of the web service 20 as input (e.g. its UDDI key, or the URL of its WSDL file). In step 201, the web service execution component 70 may prepare the execution of the call. In step 202, it may access the information stored in the registry 10 to determine in step 204 the endpoint for the web service to be called, for example based on the WSDL file obtained from the registry 10. It is to be noted that the endpoint resulting in step 204 may depend on an input parameter provided by the application 30 and contained in its call as explained above, e.g., a certain property value in order to define a certain environment for the execution of the web service call. If there is no web service available at the indicated endpoint, an error may be indicated or otherwise provided. Otherwise, the web service execution component 70 may call the identified web service in step 205, which may then be executed in step 206 so that the results can be returned to the application 30 in step 207.

The described managing of the endpoints in the registry allows in addition at deployment time of the tested application 30 to identify all service endpoints previously used for testing that application and to permanently replace them by the endpoints already registered in the registry 10 for the production landscape. Further, web service calls can be monitored at runtime and checked whether a landscape crossing occurs, e.g., whether one web services is called, which belongs to a first landscape, such as the test landscape 50, and another web service 50' is called, which belongs to another landscape such as the production landscape 50'. If such an inconsistency is noted during runtime, a warning may be issued.

Generally, the identification of the caller's landscape can use multiple mechanisms, e.g., a DNS-domain based separation of test and production landscape. The landscape information can be sent alongside the web service call. The following example of a WSDL file stored in the registry 10 requires such information and assumes that there is a specific SOAP module for landscape information management:

```
<?xml version="1.0" encoding="UTF-8"?>
<description
        xmlns="http://www.w3.org/2006/01/wsdl"
        targetNamespace="http://namespaces.softwareag.com/2004/wsdl/resSvc"
        xmlns:tns="http://namespaces.softwareag.com/2004/wsdl/resSvc"
        xmlns:ghns="http://namespaces.softwareag.com/2004/schemas/resSvc"
        xmlns:wsoap="http://www.w3.org/2006/01/wsdl/soap"
        xmlns:soap="http://www.w3.org/2003/05/soap-envelope"
        xmlns:wsdlx="http://www.w3.org/2006/01/wsdl-extensions"
>
    <documentation>
        This document describes the reservation Web service.
    </documentation>
    <types>
        <xs:schema xmlns:xs="http://www.w3.org/2001/XMLSchema"
targetNamespace="http://namespaces.softwareag.com/2004/schemas/resSvc"
xmlns="http://namespaces.softwareag.com/2004/schemas/resSvc">
            <xs:element name="checkAvailability" type="tCheckAvailability"/>
            <xs:complexType name="tCheckAvailability">
```

```
            <xs:sequence>
                <xs:element name="checkInDate" type="xs:date"/>
                <xs:element name="checkOutDate" type="xs:date"/>
                <xs:element name="roomType" type="xs:string"/>
            </xs:sequence>
        </xs:complexType>
        <xs:element name="checkAvailabilityResponse" type="xs:double"/>
        <xs:element name="invalidDataError" type="xs:string"/>
    </xs:schema>
</types>
<interface name="reservationInterface">
    <fault name="invalidDataFault" element="ghns:invalidDataError"/>
    <operation name="opCheckAvailability"
            pattern="http://www.w3.org/2006/01/wsdl/in-out"
            style="http://www.w3.org/2006/01/wsdl/style/iri"
            wsdlx:safe="true">
        <input messageLabel="In" element="ghns:checkAvailability"/>
        <output messageLabel="Out"
                element="ghns:checkAvailabilityResponse"/>
        <outfault ref="tns:invalidDataFault" messageLabel="Out"/>
    </operation>
</interface>
<binding name="reservationSOAPBinding"
        interface="tns:reservationInterface"
        type="http://www.w3.org/2006/01/wsdl/soap"
        wsoap:protocol="http://www.w3.org/2003/05/soap/bindings/HTTP">
    <fault ref="tns:invalidDataFault" wsoap:code="soap:Sender"/>
    <operation ref="tns:opCheckAvailability"
            wsoap:mep="http://www.w3.org/2003/05/soap/mep/soap-response"/>
</binding>
<service name="reservationService"
                    interface="tns:reservationInterface">
    <endpoint name="reservationEndpointTest"
            binding="tns:reservationSOAPBinding"
            address="http://test.softwareag.com/2004/reservation">
        <wsoap:module
            uri="http://features.example.com/2005/modules/landscapes"
            required="true"/>
        <property ref="http://features.softwareag.com/landscapes/type">
            <documentation>
                This endpoint belongs to the test landscape
            </documentation>
            <value>test</value>
        </property>
    </endpoint>
    <endpoint name="reservationEndpointProduction"
                binding="tns:reservationSOAPBinding"
                address="http://production.softwareag.com/2004/reservation">
        <wsoap:module
            uri="http://features.example.com/2005/modules/landscapes"
            required="true"/>
        <property ref="http://features.softwareag.com/landscapes/type">
            <documentation>
                This endpoint belongs to the production landscape
            </documentation>
            <value>production</value>
        </property>
    </endpoint>
</service>
</description>
```

Alternatively, the registry 10 may store information about the development stage of a certain application and cause an appropriate selection of the endpoints (e.g. based on recorded deployment of the application). This may either be done for the whole landscape or also individually for each web service.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A non-transitory computer accessible memory medium for managing a plurality of web services in a service oriented architecture (SOA), wherein the memory medium stores:

a registry including a description for at least one of the plurality of web services in the SOA, wherein the description of the at least one web service comprises:

a first endpoint for a first runtime condition, wherein the first endpoint comprises a first entry point to the at least one web service in the SOA; and a second endpoint for a second runtime condition, wherein the second endpoint comprises a second entry point to the at least one web service in the SOA;

wherein the first and second endpoints are defined in at least one Web Services Description Language (WSDL) document for the web service, wherein the first and second endpoints are defined as a property component of the at least one WSDL document, and wherein the value of the property component is determined during runtime;

wherein the registry further stores information about a development stage of an application that uses the plurality of web services in the SOA, and wherein the registry causes an appropriate selection of one of the first and second endpoints during runtime depending on the stored information.

2. The non-transitory memory medium of claim 1, wherein the memory medium comprises program instructions executable by a processor to:

select one of the first and second endpoints during runtime depending on an evaluation of environmental information concerning the runtime condition provided by an application calling the web service.

3. The non-transitory memory medium of claim 1, wherein the memory medium comprises program instructions executable by a processor to:

select one of the first and second endpoints during runtime depending on the runtime condition stored in the registry.

4. The non-transitory memory medium of claim 1, wherein the first and second endpoints are defined in a first and a second WSDL document for the web service, which are related to each other.

5. The non-transitory memory medium of claim 1, wherein the first and second endpoints are defined in a single WSDL document for the web service.

6. The non-transitory memory medium of claim 5, wherein the value of the property component is determined during runtime using a Simple Object Access Protocol (SOAP) module of a request for the web service.

7. The non-transitory memory medium claim 1, wherein the registry is a Universal Description, Discover, and Integration (UDDI) registry.

8. The non-transitory memory medium of claim 1, wherein the first endpoint is configured for testing an application calling the at least one web service.

9. The non-transitory memory medium of claim 1, wherein the second endpoint is configured for deployment of an application calling the at least one web service.

10. The non-transitory memory medium of claim 1, wherein the registry further comprises a third endpoint for a third runtime condition.

11. The non-transitory memory medium of claim 1, wherein the memory medium comprises program instructions executable by a processor to:

monitor the endpoints of the plurality of web services during runtime; and issue a warning if a first web service is called with an endpoint for a first runtime condition and a second web service is called with an endpoint for a second runtime condition.

12. A method for managing a plurality of web services in a service oriented architecture (SOA), the method comprising:

storing a description for at least one of the plurality of web services in a registry, wherein the description of the at least one web service comprises:

a first endpoint for a first runtime condition, wherein the first endpoint comprises a first entry point to the at least one web service in the SOA; and a second endpoint for a second runtime condition, wherein the second endpoint comprises a second entry point to the at least one web service in the SOA; and wherein the first and second endpoints are defined in at least one Web Services Description Language (WSDL) document for the web service, wherein the first and second endpoints are defined as a property component of the at least one WSDL document, and wherein the value of the property component is determined during runtime; and wherein the registry further stores information about a development stage of an application that uses the plurality of web services in the SOA, and wherein the registry causes an appropriate selection of one of the first and second endpoints during runtime depending on the stored information.

13. The method of claim 12, further comprising:

selecting one of the first and second endpoints during runtime depending on the evaluation of environmental information concerning the runtime condition provided by an application calling the web service.

14. The method of claim 12, further comprising:

storing the runtime condition in the registry; and selecting one of the first and second endpoints during runtime.

15. The method of claim 12, wherein said storing a description comprises storing a first WSDL document for the web service indicating the first endpoint and storing a second WSDL document for the web service indicating the second endpoint, wherein the first and second WSDL documents are stored in the registry as related WSDL documents.

16. The method of claim 12, wherein said storing a description comprises storing a single WSDL document for the web service with property components indicating the first and second endpoints.

17. The method of claim 16, wherein the values of the property components are determined during runtime using a Simple Object Access Protocol (SOAP) module of a request for the web service.

18. The method of claim 12, wherein the registry is a Universal Description, Discovery, and Integration (UDDI) registry.

19. The method of claim 12, further comprising using the first endpoint for testing an application calling the at least one web service.

20. The method of claim 12, further comprising:

using the second endpoint for deployment of an application calling the at least one web service.

21. The method of claim 12, wherein the registry further comprises a third endpoint for a third runtime condition.

22. The method of claim 12, further comprising:

monitoring the endpoints of the plurality of web services during runtime and issuing a warning, if a first web service is called with an endpoint for a first runtime condition and a second web service is called with an endpoint for a second runtime condition.

* * * * *